United States Patent [19]

Fujioka et al.

[11] 4,423,550

[45] Jan. 3, 1984

[54] COMPOSITE MAGNETIC HEAD STRUCTURE AND PROCESS FOR MANUFACTURING THE SAME

[75] Inventors: Yoshiharu Fujioka, Yamato; Shushi Takei, Yokohama, both of Japan

[73] Assignee: Tokyo Shibaura Denki Kabushiki Kaisha, Kawasaki, Japan

[21] Appl. No.: 256,050

[22] Filed: Apr. 21, 1981

[30] Foreign Application Priority Data

Apr. 30, 1980 [JP] Japan ................................. 55/57525

[51] Int. Cl.³ .............................................. G11B 5/42
[52] U.S. Cl. ..................................... 29/603; 360/118; 360/121
[58] Field of Search .................. 29/603; 360/118, 121, 360/119, 120

[56] References Cited

FOREIGN PATENT DOCUMENTS

| | | | |
|---|---|---|---|
| 53-6015 | 1/1978 | Japan | 29/603 |
| 54-2110 | 1/1979 | Japan | 29/603 |
| 54-45115 | 4/1979 | Japan | 29/603 |
| 54-105512 | 8/1979 | Japan | 360/120 |

OTHER PUBLICATIONS

Borchert, K. R. & O'Donnell, Jr., R. T., *High Density Laminated Head*, IBM Technical Disclosure Bulletin, vol. 15, No. 1, Jun. 1972, p. 330.

*Primary Examiner*—Carl E. Hall
*Assistant Examiner*—P. W. Echols

*Attorney, Agent, or Firm*—Oblon, Fisher, Spivak, McClelland & Maier

[57] ABSTRACT

A composite head structure having a front core consisting of a non-magnetic spacing device for separating a read-write magnetic flux path from an erase magnetic flu path and first and second core chips adhered together with the spacing device interposed between them. A read/write gap is formed at the central portion of the first core chip which is parallel to the longitudinal direction of the spacing device and whose width is defined by first and second notches which extend from respective side edges of the first core chip. Erase gaps are formed in the second core chip which extend between the side edges of the second core chip parallel to the longitudinal direction of the spacing device and whose widths are defined by a third notch formed at a position substantially corresponding to the read/write gap as viewed along the direction of the arrangement of the first and second core chips. A back core is adhered to the front core and forms the read/write magnetic flux path and the erase magnetic flux path with the back core having a read/write magnetic leg forming the read/write magnetic flux path and an erase leg forming the erase magnetic flux path as well as a common leg forming both the magnetic flux paths. A fourth notch separates the magnetic flux paths formed at a position corresponding to the spacing device. a read/write winding is wound on the read/write leg and an erase winding is wound on the erase leg.

5 Claims, 22 Drawing Figures

COMPOSITE MAGNETIC HEAD STRUCTURE AND PROCESS FOR MANUFACTURING THE SAME

BACKGROUND OF THE INVENTION

1. Field of the Invention

The present invention relates to a composite magnetic head structure assembled in a floppy disk system or the like and to a process for manufacturing the same.

2. Description of the Prior Art

A conventional composite magnetic head structure generally comprises: a magnetic core consisting of a read/write leg chip and an erase leg chip each of substantially C-shaped section, arranged in opposition to each other with a common leg chip interposed therebetween; a read/write winding which is wound on the read/write leg chip; and an erase winding which is wound on the erase leg chip. In use, a read/write current flows through the read/write winding and an erase current flows through the erase winding. By this electrical conduction, a read/write magnetic flux path is formed through the read/write leg chip and the common leg chip, and an erase magnetic flux path is formed through the erase leg chip and the common leg chip.

Figure 1A:
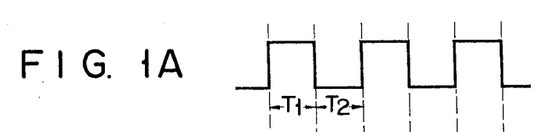
FIG. 1A shows the waveform of a recording signal.
Figure 1B:
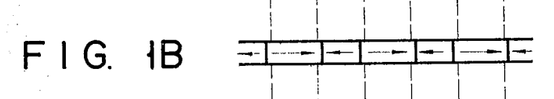
FIG. 1B shows the residual magnetism pattern in the case wherein the recording signal shown in FIG. 1A is recorded with a conventional magnetic head structure.
Figure 1C:
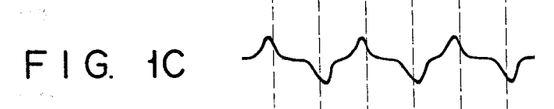
FIG. 1C shows the waveform of the reproduced signal read out from the recording medium having the residual magnetism of the pattern shown in FIG. 1B.

In such a case, since the common leg chip is common to both these magnetic flux paths, these magnetic flux paths are not completely separated from each other, but electro-magnetically mutually influence each other. In particular, part of the erase magnetic flux path coincides with the read/write magnetic flux path. Thus, the read/write magnetic flux path is biased by the DC erase current. For a symmetrical pulse signal waveform to be recorded as shown in FIG. 1A, the residual magnetism pattern in the recording medium for recording this signal does not repeat the same mode but alternately repeats two different modes as shown in FIG. 1B. Therefore, the reproduced waveform also alternately repeats the two different modes as shown in FIG. 1C. Accordingly, the pulse signal waveform pattern after waveform shaping does not become the pulse waveform pattern shown in FIG. 1A but the asymmetrical pattern shown in FIG. 1D. Thus, the reproduced signal contains large distortion components and the reproducing precision becomes low.

In such a conventional composite magnetic head structure, a notch for defining the gap width determining the track width is formed in the core. However, since there is nothing in the interior of the notch, the recording medium, when in sliding contact with the core surface, may be caught on the exposed edge of the notch and damaged. In some cases, the edge of the notch may be broken by the sliding contact between the head structure and the medium.

Thus, a conventional composite magnetic head structure has these drawbacks and an improvement therein together with a simple process for manufacturing it have been desired.

SUMMARY OF THE INVENTION

The present invention provides a composite magnetic head structure which electro-magnetically separates a read/write magnetic flux path from an erase magnetic flux path as much as possible to improve the reproducing precision and which has improved durability, and to provide a simple process for manufacturing such a composite magnetic head structure.

According to the present invention, there is provided a composite magnetic head structure comprising:

a front core consisting of non-magnetic spacing means for separating a read/write magnetic flux path from an erase magnetic flux path and first and second core chips adhered together with the spacing means interposed therebetween, at the central portion of said first core chip being formed a read/write gap which is parallel to the longitudinal direction of said spacing means and whose width is defined by first and second notches extending from respective side edges of said first core chip, and erase gaps being formed in said second core chip which extend from the respective side edges of said second core chip in parallel to the longitudinal direction of said spacing means and whose widths are defined by a third notch formed at a position substantially corresponding to said read/write gap as viewed along the direction of arrangement of said first and second core chips;

a back core adhered to said front core forming said read/write magnetic flux path and said erase magnetic flux path, said back core having a read/write magnetic leg forming said read/write magnetic flux path, an erase leg forming said erase magnetic flux path, and a common leg forming both said magnetic flux paths and having a fourth notch formed at a position corresponding to said spacing means, for separating said magnetic flux paths;

a read/write winding which is wound on said read/write leg; and an erase winding which is wound on said erase leg.

According to the present invention, there is also provided a process for manufacturing a composite magnetic head structure comprising the steps of:

forming in a first magnetic plate and a second magnetic plate a plurality of parallel notches, at a predetermined pitch, of a predetermined width with the space between notches defining a track width;

forming a groove defining a gap depth in said first magnetic plate in a direction perpendicular to said plurality of parallel notches;

adhering said first and second magnetic plates in such a manner that a non-magnetic material layer is interposed therebetween and said plurality of parallel notches in said respective magnetic plates oppose each other to form a plurality of holes;

opposing and adhering two assemblies formed by said adhering step in such a manner that non-magnetic spacing means is interposed therebetween and said plurality of parallel holes of said assemblies are mutually shifted by half the pitch;

cutting the obtained adhered assemblies into a plurality of assembly blocks along planes extending perpendicular to said spacing means and perpendicular to the longitudinal direction of said plurality of holes;

cutting the obtained assembly block into a plurality of first assembly chips along lines passing the middle points between said holes of one assembly and perpendicular to the longitudinal direction of said spacing means; and adhering said first assembly chips with second assembly chips processed to have grooves to form a first side leg, a second side leg and a common leg having a notch to correspond with said spacing means in such a manner that said notch of said common leg corresponds with said spacing means, thereby defining first and second magnetic flux paths, and forming respective windings on said first and second side legs.

BRIEF DESCRIPTION OF THE DRAWINGS

This invention can be more fully understood from the following detailed description when taken in conjunction with the accompanying drawings, in which.

DETAILED DESCRIPTION OF THE PREFERRED EMBODIMENTS

Figure 2:
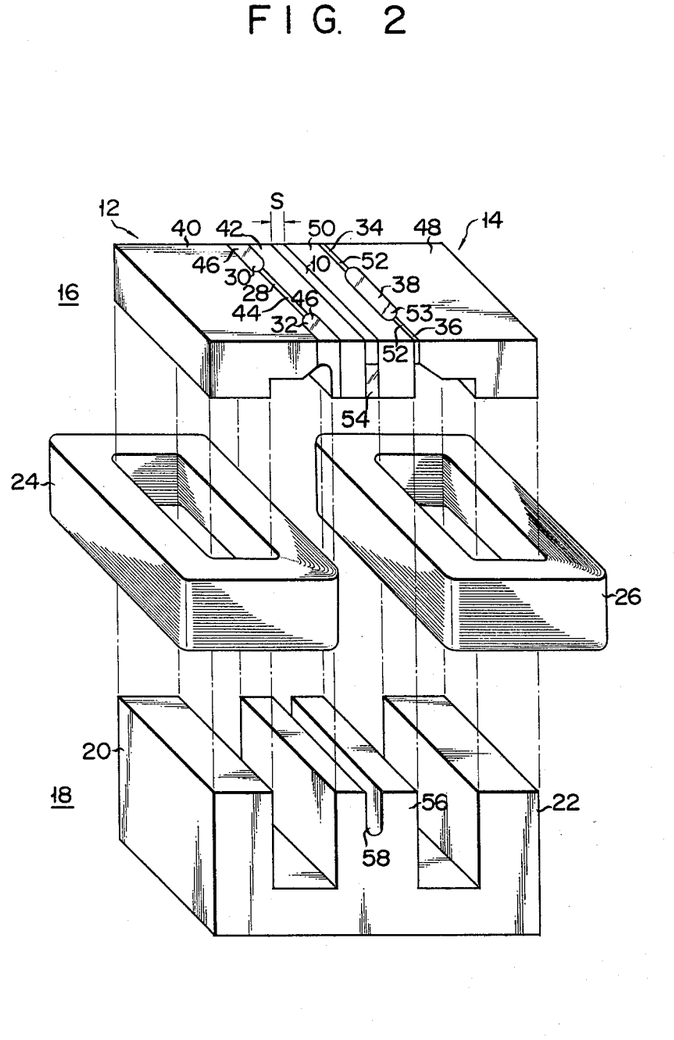
FIG. 2 is an exploded view of a composite magnetic head structure according to an embodiment of the present invention.

Referring to FIG. 2, a magnetic head structure comprises a front core 16 consisting of a read/write core chip 12 and an erase core chip 14 adhered together with a spacer 10 of a non-magnetic material interposed therebetween for forming a space S; a back core 18 of substantially E-shape section which is adhered to the rear surface of the front core 16 and which forms a read/write magnetic flux path and an erase magnetic flux path through the core chips 12 and 14, respectively; and a read/write winding 24 and an erase winding 26 respectively wound on a read/write leg 20 and an erase leg 22 of the back core 18.

In FIG. 2, a read/write gap 28 of a predetermined track width is formed to extend along the longitudinal direction of the spacer 10. The width (write track width) of the read/write gap 28 is defined by notches 30 and 32 formed in the same longitudinal direction of the gap 28 to extend inwardly from the respective side edges of the chip 12. The read/write gap 28 is formed at the central portion of the chip 12 between the notches 30 and 32.

Erase gaps 34 and 36 of a predetermined width, respectively, are also formed in the erase core chip 14 along the longitudinal direction of the spacer 10 in FIG. 2 to extend inwardly along the same line from the respective side edges of the chip 14. The widths of the erase gaps 34 and 36 are defined by a notch 38 formed at the central portion of the same longitudinal line.

Describing the construction of the read/write core chip 12 in more detail, the core chip 12 is of the construction according to which a chip element 40 of a magnetic material and of substantially L-shaped section and a chip element 42 of a magnetic material and of small length are opposed and adhered to each other with a non-magnetic film 44 defining the width of the read/write gap 28 therebetween. The notches 30 and 32 are formed in the chip elements 40 and 42 to extend inwardly from the opposing surfaces thereof. A glass material 46 for mutually adhered the chip elements 40 and 42 is filled inside these notches 30 and 32 to the surfaces of the chip elements 40 and 42. The non-magnetic film 44 is formed by, for example, the vapor deposition process or the sputtering process of a non-magnetic material on one of the opposing surfaces of the chip elements 40 and 42. The distance between the chip elements 40 and 42, that is, the length of the read/write gap 28, is defined by the thickness of the film 44.

The erase core chip 14 is also of the construction according to which a chip element 48 of a magnetic material and of substantially L-shaped section and a chip element 50 of a magnetic material and of small width are opposed and adhered to each other with a non-magnetic film 52 interposed therebetween. The notch 38 is formed at substantially the middle point between the opposing surfaces of the chip elements 48 and 50. A glass material 53 is filled in the notch 38 to the surfaces of the chip element 48 and 50 for adhering the chip elements 48 and 50 together. The non-magnetic film 52 is formed by, for example, the vapor deposition process or the sputtering process on one of the opposing surfaces of the chip elements 48 and 50. The distance between the chip elements 48 and 50 is defined by the thickness of the film 52.

The core chips 12 and 14 of such constructions are adhered together by a glass material 54 inserted below the spacer 10 in such a manner that their chip elements 42 and 50 of small width oppose each other with the non-magnetic spacer 10 interposed therebetween. As may be apparent from FIG. 2, the longitudinal direction of the core chip 12 is parallel to the longitudinal direction of the gaps 34 and 36 of the core chip 14. When viewed from the direction of the arrangement of the core chips 12 and 14, the position of the gap 28 of the core chip 12 substantially corresponds with the position of the notch 38 of the core chip 14. In other words, as viewed along the direction of the arrangement of the core chips 12 and 14, the inner end edges of the erase gaps 34 and 36 are substantially on the same lines as the end edges of the read/write gap 28.

The non-magnetic spacer 10 defines a space S between the core chips 12 and 14. This space S functions to magnetically separate and prevent mutual interference between the read/write magnetic flux path and the erase magnetic flux path which are formed when the front core 16 consisting of the core chips 12 and 14 is adhered to the back core 18.

The back core 18, as shown in FIG. 2, has a substantially E-shaped section and also has, at its central portion, a common leg 56 and, at the respective sides, the read/write leg 20 and the erase leg 22 which are substantially parallel to the common leg 56.

The adhered condition of the front core 16 and the back core 18 is as follows. The back core 18 is adhered to the front core 16 in such a manner that the front end face of the read/write leg 20 is positioned at the rear surface of the L-shaped element 40 of the read/write core chip 12, and the front end face of the erase leg 22 is positioned at the rear surface of the L-shaped element 48 of the erase core chip 14. In this case, therefore, the surface of the common leg 56 is positioned at the rear surfaces of the elements 42 and 50 of small width of the core chips 12 and 14. A notch 58 is formed in the common leg 56 at a position opposing the spacer 10 of the front core 16. The notch 58, similar to the space S in the front core 16, functions to separate the read/write magnetic flux path from the erase magnetic flux path as will be described hereinafter. On the read/write leg 20 and the erase leg 22 of the back core 18 are wound the read/write winding 24 and the erase winding 26, respectively.

In a composite magnetic head structure of the construction described above, the spacer 10 is incorporated in the front core 16 to define the space S for magnetically separating the read/write magnetic flux path and the erase magnetic flux path; and the notch 58 is formed at the position of the common leg 56 of the back core 18 corresponding to the space S described above for magnetically separating the read/write magnetic flux path from the erase magnetic flux path.

The separation effect obtained with the space S defined by the spacer 10 and the notch 58 will now be described with reference to a case wherein this space S and the notch 58 are not formed.

Figure 3:
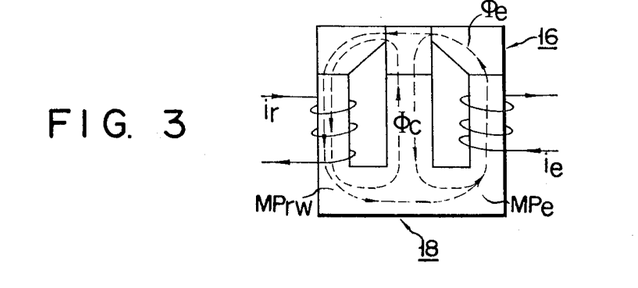
FIG. 3 is a view illustrating the construction and the magnetic flux paths of a magnetic head structure wherein notches for separating the magnetic flux paths are not formed in either the front core or the back core.
Figure 4:
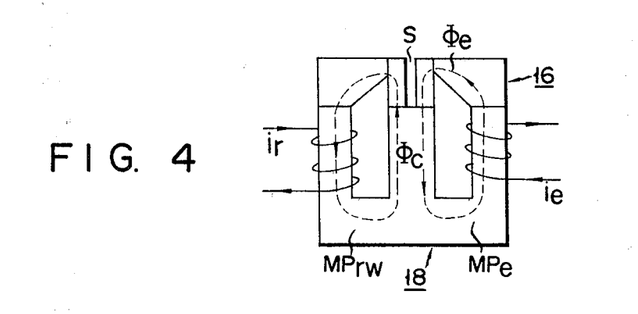
FIG. 4 shows the construction and the magnetic flux paths of a magnetic head structure wherein notches for separating the magnetic flux paths are formed in only the front core.

FIG. 3 shows the schematic construction and the magnetic flux paths of a magnetic head structure in which neither the space S nor the notch 58 are formed; FIG. 4 shows the schematic construction and the magnetic flux paths of a magnetic head structure in which the notch 58 is not formed but the space S is formed; and FIG. 5 shows the schematic construction and the magnetic flux paths of a magnetic head structure in which both the space S and the notch 58 are formed.

As shown in FIG. 3, with a magnetic head structure wherein neither the space S nor the notch 58 are formed, not only part of the erase magnetic flux $\Phi_3$ coincides with the read/write magnetic flux path MPrw, but also the magnetic flux $\Phi_c$ in the common leg coincides the read/write magnetic flux path MPrw and the erase magnetic flux path MPe. For this reason, the separation between the read/write magnetic flux path MPrw and the erase magnetic flux path MPe becomes extremely low, and the mutual magnetic interference becomes significant. In FIGS. 3, 4 and 5, ir denotes the read current and ie denotes the erase current.

Figure 1D:
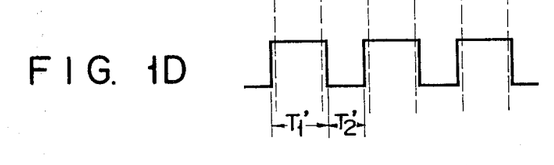
FIG. 1D shows the waveform of the signal after shaping the waveform of the reproduced signal shown in FIG. 1C.
Figure 6:
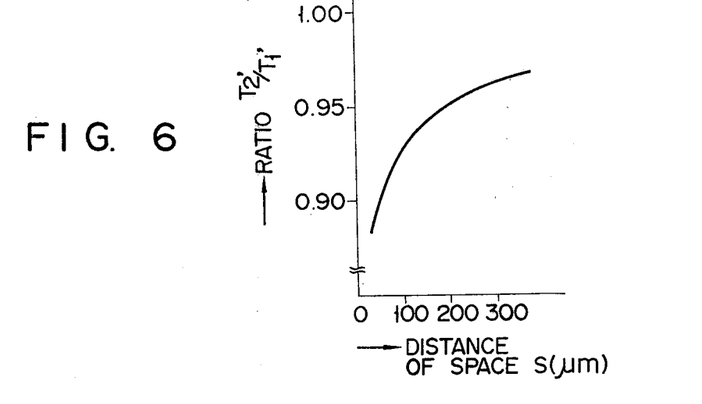
FIG. 6 shows a characteristic curve representing the separation effect obtained with the magnetic head structure wherein the separation notches are formed in only the front core.

Considering the case wherein the space S is formed as shown in FIG. 4, the influence of the magnetic flux $\Phi_c$ in the common leg may not be prevented. However, the influence of the erase magnetic flux $\Phi_e$ on the read/write magnetic flux path MPrw may be reduced by the space S formed in the front core 16. Thus, separation between the read/write magnetic flux path MPrw and the erase magnetic flux path MPe may be achieved to a considerably efficient degree. The separation effect varies with the distance of the space S. The characteristic curve showing the separation effect for this case is shown in FIG. 6 wherein the distance of the space S is plotted along the abscissa and the pulse width ratio T2'/T1' is plotted along the ordinate (FIG. 1D). The pulse width ratio T2'/T1' is proportional to the separation effect. As may be apparent from FIG. 6, as the distance of the space S increases from 100μ to 200μ and to 300μ, the pulse width ratio T2'/T1' is gradually improved.

Figure 5:
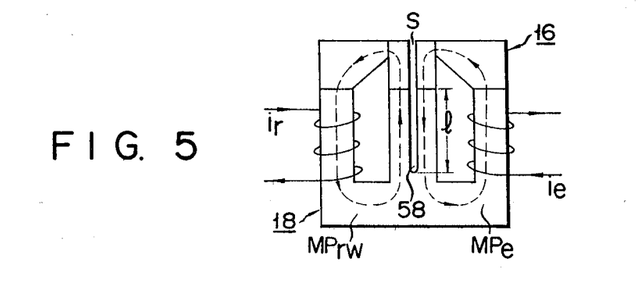
FIG. 5 shows the construction and the magnetic flux paths of a magnetic head structure wherein notches for separating the magnetic flux paths are formed in both the front core and the back core.
Figure 7:
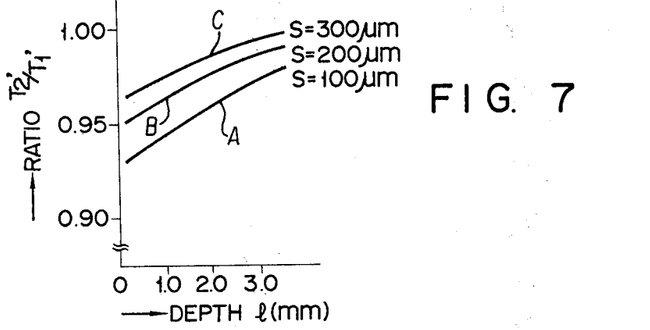
FIG. 7 shows a characteristic curve representing the separation effect obtained with a magnetic head structure wherein the separation notches are formed in the front and back cores.

Next, the separation effect will be considered for the case wherein the space S is formed in the front core 16 and the notch 58 is formed in the back core 18, as shown in FIG. 5. In this case, the influence of the erase magnetic flux $\Phi_e$ on the read/write magnetic flux path MPrw is vastly diminished by the space S formed in the front core 16. Moreover, the influence of the magnetic flux $\Phi_c$ in the common leg is also significantly diminished by the notch 58 formed in the back core 18, so that the separation effect is vastly improved. In this case, the separation effect varies with the distance of the space S and the depth l of the notch 58. The characteristic curve showing the separation effect for this case is shown in FIG. 7 wherein the depth l in mm of the notch 58 is plotted along the abscissa and the pulse width ratio T2'/T1' is plotted along the ordinate. Referring to FIG. 7, curves A, B and C correspond to cases wherein the distance of the space S is 100 μm, 200 μm and 300 μm, respectively. As may be apparent, from curves A, B and C, the pulse width ratio T2'/T1' is improved as the distance of the space S increases and as the depth l increases. Thus, a reproduced signal which is substantially symmetrical becomes possible.

As may be apparent from the above, in a composite magnetic head structure of the construction of the present invention shown in FIG. 2 in which the space S is formed in the front core 16 and the notch 58 is formed in the back core 18, the read/write magnetic flux path and the erase magnetic flux path are magnetically separated with high efficiency, and a reproduced signal which is substantially symmetrical becomes possible.

In the magnetic head structure shown in FIG. 2, the hard glass material 46 adhering together the chip elements 40 and 42 is filled in the notches 30 and 32, and the hard glass material 53 adhering the chip elements 48 and 50 together is filled in the notch 38. For this reason, the edges of the notches 30, 32 and 38 are not exposed, unlike the case wherein no material is filled in the notches 30, 32 and 38. Even when the magnetic head structure is displaced in slidable contact with the recording medium, damage due to the recording medium catching on these edges is prevented. These glass materials 46 and 53 are hard, have a high abrasion resistance, and are harder to damage. Therefore, the possibility of exposure of the edges of the notches 30, 32 and 38 due to damage to the glass materials 46 and 53 is small, so that damage to the edges of the notches 30, 32 and 38 by the slidable contact with the recording medium also becomes small.

Figure 8:
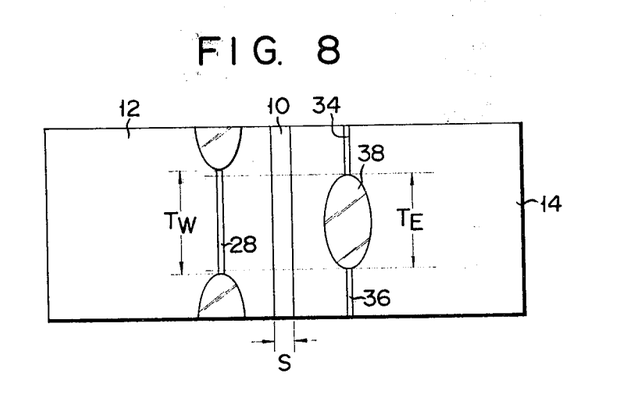
FIG. 8 is a view illustrating a modification of the read/write gap and the erase gap in the magnetic head structure of the present invention.
Figure 9:
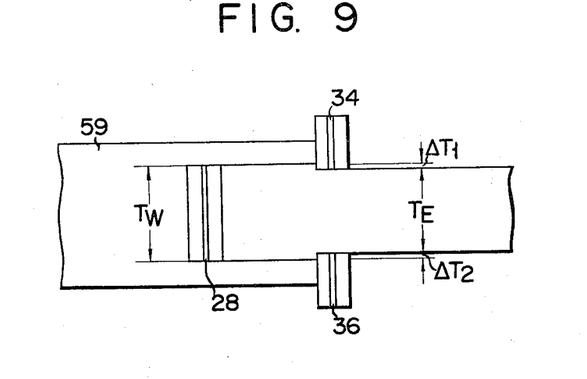
FIG. 9 shows the read/write mode and the erase mode with the modification shown in FIG. 8.

The description has been made with reference to the magnetic head structure shown in FIG. 2 assuming that the position of the gap 28 of the core chip 12 substantially corresponds with the position of the notch 38 of the core chip 14; that is, the width of the gap 28 is substantially the same as that of the notch 38. However, another construction as shown in FIG. 8 is possible according to which the width of the notch 38 is smaller, and the erase gaps 34 and 36 of the core chip 14 extend further inward, thereby elongating the lengths of the erase gaps 34 and 36 and making part of the erase gaps 34 and 36 overlap the read/write gap 28 as viewed along the direction of the arrangement of the core chips 12 and 14. In this case, as may be obvious from FIG. 9, the write track width in a recording medium 59 may be regulated substantially by the erase gaps 34 and 36, and the track density may be improved.

The composite magnetic head structure of the construction shown in FIg. 2 is manufactured, for example, by a process illustrated in FIGS. 10A to 10H, FIG. 11 and FIG. 12.

Figure 10A:
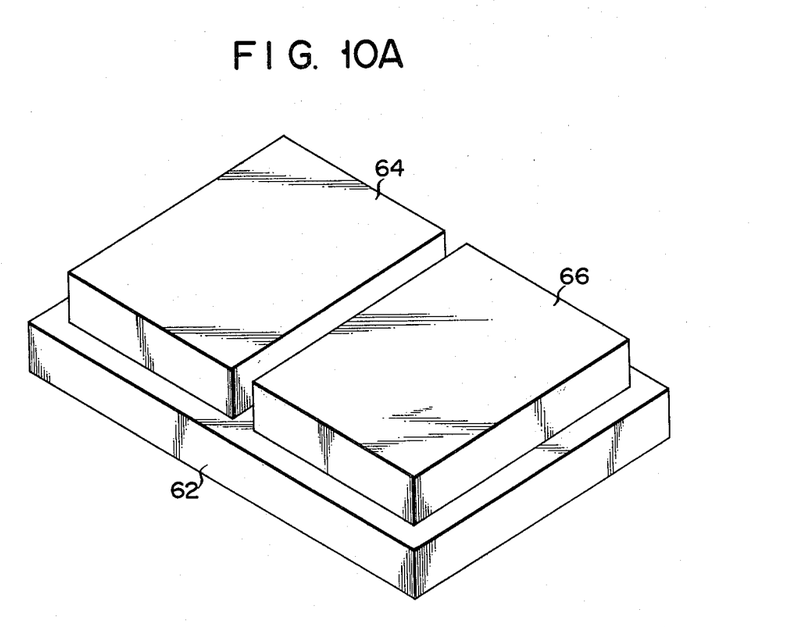
FIGS. 10A to 10H, FIG. 11 and FIG. 12 are views illustrating respective steps for manufacturing the magnetic head structure shown in FIG. 2.
Figure 10B:
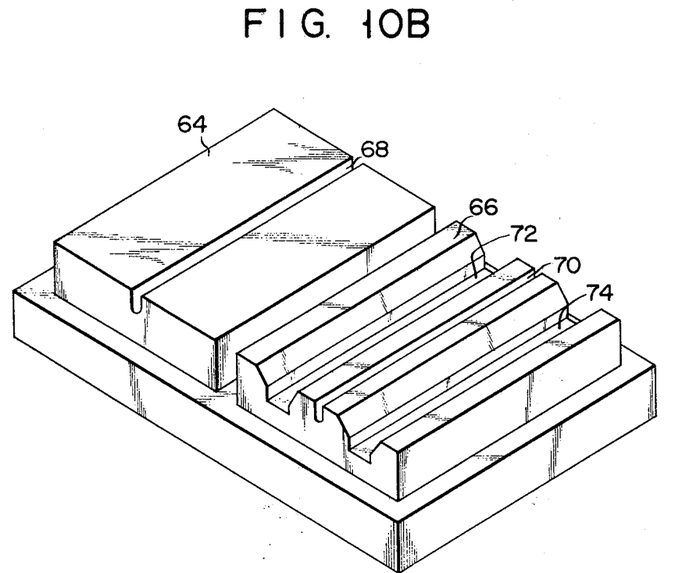
Figure 10C:
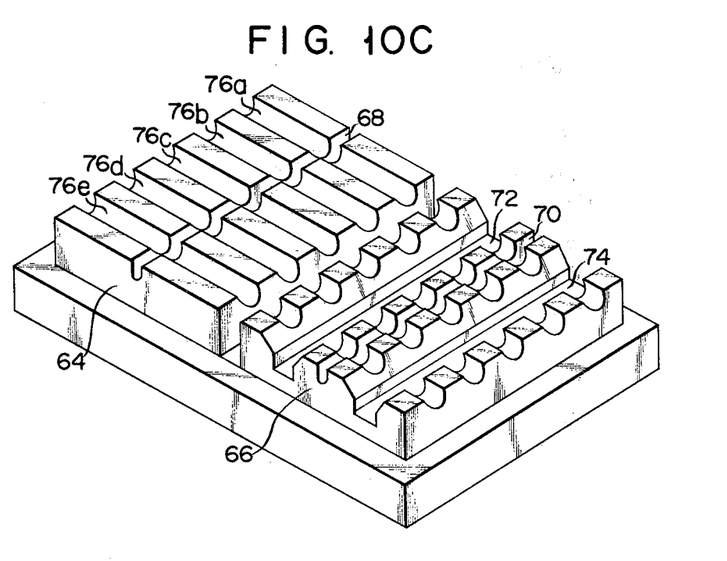

First, as shown in FIG. 10A, two magnetic plates 64 and 66 of predetermined thickness are arranged on a base plate 62 in alignment with each other. Then, as shown in FIG. 10B, central grooves 68 and 70 are formed in the magnetic plates 64 and 66 in a direction perpendicular to the direction of their alignment and, at the same time, grooves 72 and 74 parallel to the groove 70 are formed at each side of the groove 70 of the magnetic plate 66. The sides of the parallel grooves 72 and 74 are cut to taper the grooves 72 and 74. In the magnetic head structure shown in FIG. 2, the magnetic plate 64 comprises the thin plate chip elements 42 and 50, and the magnetic plate 66 comprises the L-shaped chip elements 40 and 48. Then, as shown in FIG. 10C, a plurality of notches 76$a$, 76$b$, 76$c$, 76$d$ and 76$e$ of equal width and constant pitch are formed along straight lines in a direction perpendicular to the grooves 68, 70, 72 and 74. The width of the notches 76$a$ to 76$e$ is determined to be substantially the same as a desired track width. The pitch of the notches 76$a$ to 76$e$ is determined to be substantially twice the desired track width.

The steps shown in FIGS. 10B and 10C may be reversed as required.

Figure 10D:
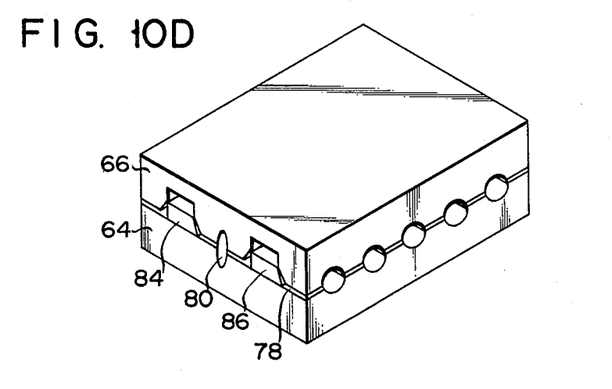
Figure 10E:
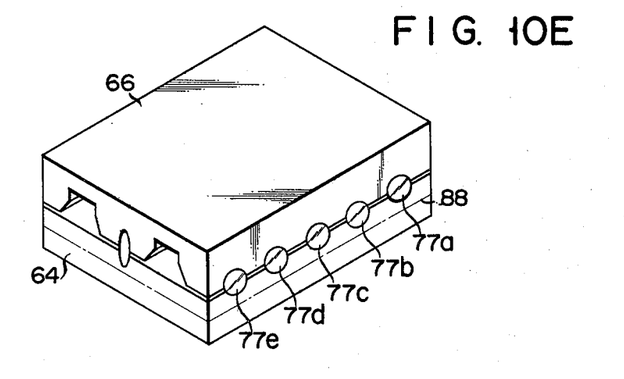
Figure 10F:
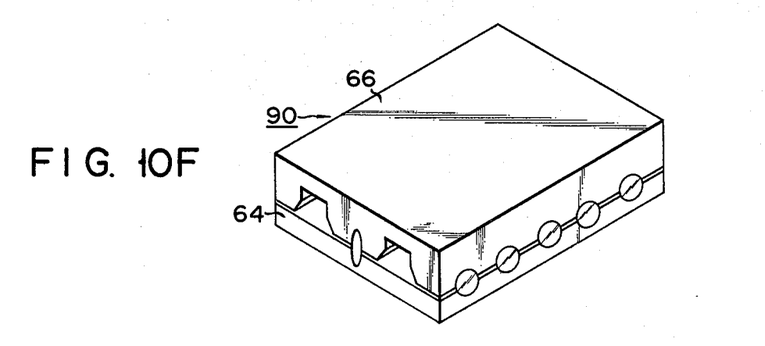

A non-magnetic film 78 defining the read/write gap 28 and the erase gaps 34 and 36 in the magnetic head structure of FIG. 2 is formed by chemical vapor deposition or by sputtering on the surface of the magnetic plate 66, that is, the surfaces of the island-shaped projecting parts formed by the grooves 70, 72, 74 and the notches 76$a$ to 76$e$. Thereafter, the magnetic plates 64 and 66 are removed from the base plate 62. Then, as shown in FIG. 10D, the magnetic plates 64 and 66 are placed in opposition to each other so that the parallel notches 76$a$ to 76$e$ formed in both these plates are opposed to each other. The magnetic plates 64 and 66 are correctly aligned by inserting a guide pin (not shown) in a hole 80 defined by the grooves 68 and 70. After alignment, as shown in FIG. 10D, glass rods 84 and 86 for adhering the magnetic plates 64 and 66 are inserted inside the grooves 72 and 74. The assembly obtained in this manner is placed inside a melting furnace under the condition that the magnetic plates 64 and 66 are placed under pressure and heat-treated at 800° C., for example, in an inert gas atmosphere of nitrogen or the like, to melt the glass rods 84 and 86. Then, as shown in FIG. 10E, the molten glass flows into a plurality of parallel holes 77$a$, 77$b$, 77$c$, 77$d$ and 77$e$ defined by the notches 76$a$ to 76$e$ formed in the magnetic plates 64 and 66. The molten glass is solidified by gradually cooling the assembly to adhere the magnetic plates 64 and 66 together. The magnetic plate 64 is cut along the alternate long and short dash line denoted by reference numeral 88 in FIG. 10E to remove the unnecessary part and to make the assembly thinner, as shown in FIG. 10F. The cut surface is then lapped.

By the process as described above, an assembly 90 is manufactured.

A plurality of these assemblies 90 are manufactured by repeating the above process.

Figure 10G:
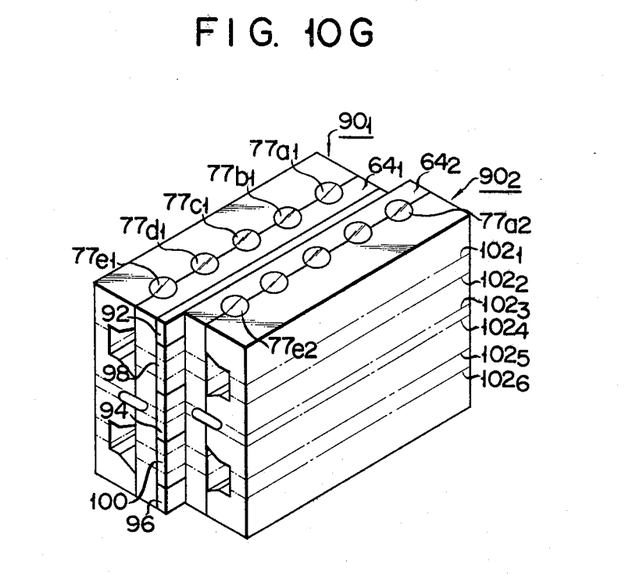
Figure 10H:
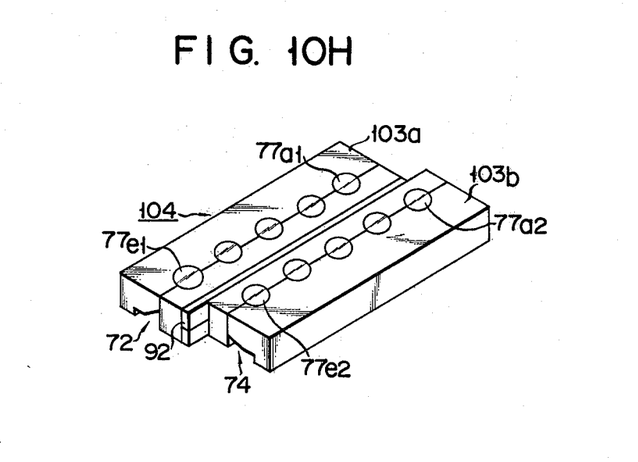

Two assemblies $90_1$ and $90_2$ manufactured in this manner are arranged so that magnetic plates $64_1$ and $64_2$ oppose each other with nonmagnetic spacer plate films 92, 94 and 96 of ceramic or the like as a spacer and low softening-point glass plates 98 and 100 as the adhering material interposed therebetween at predetermined positions as shown in FIG. 10G. The spacer plate films 92 and 96 are arranged along the edges of the adhering surfaces, and the spacer plate film 94 is arranged at the central portion of the adhering surface. The glass plate 98 is arranged between the spacer plate films 92 and 94, and the glass plate 100 is arranged between the spacer plate films 94 and 96. The non-magnetic films 92, 94 and 96 may be formed by, for example, vapor deposition. The assemblies $90_1$ and $90_2$ are arranged such that respective holes 77$a$1 to 77$e$1 of the assembly $90_1$ are shifted by half the pitch from corresponding holes 77$a$2 to 77$e$2 of the assembly $90_2$. They are thus arranged such that the respective holes 77$a$1 to 77$e$1 of the assembly $90_1$ are located halfway between the holes 77$a$2 to 77$e$2 of the assembly $90_2$. After this alignment, the entire structure is cut and divided along six alternate long and short dash lines denoted by reference numerals $102_1$, $102_2$, $102_3$, $102_4$, $102_5$ and $102_6$ in FIG. 10G. Thus, as shown in FIG. 10H, four assemblies 104 are formed, each consisting of components 103$a$ and 103$b$ with the non-magnetic film 92 interposed therebetween. The cut surfaces of these assemblies 104 are lapped. Each assembly 104 of this construction is divided into a plurality of chips as will be made clear hereinafter. Each of these chips constitutes a front core chip 12 of the magnetic head structure shown in FIG. 2.

Figure 11:
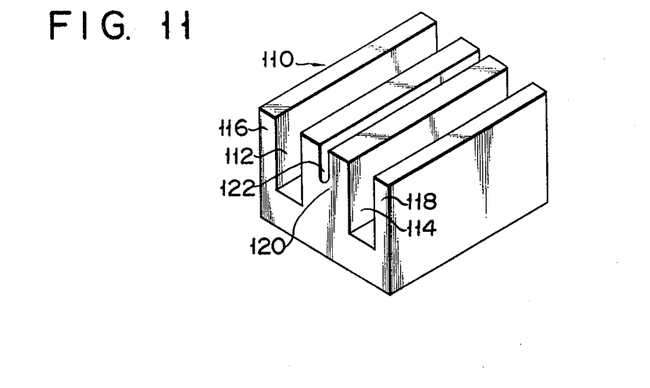

A magnetic plate of predetermined thickness and size is separately prepared and processed to form grooves and a notch to provide an assembly 110 as shown in FIG. 11. Grooves 112 and 114 are formed at the positions of the assembly 110 which correspond with the grooves 72 and 74 of the assembly 104 when the assemblies 110 and 104 are opposed to each other. These grooves 112 and 114 define side legs 116 and 118 and a common leg 120. A notch 122 for separation of the magnetic flux paths is formed at the position of the common leg 120 corresponding to the non-magnetic spacer plate film 92 of the assembly 104.

Figure 12:
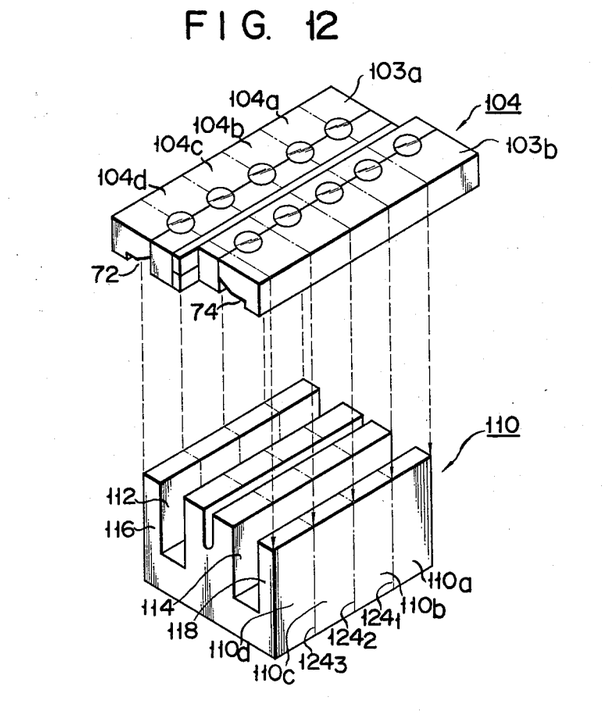

The assembly 110 thus obtained is then divided into a plurality of chips which are of the same construction as that of the back core 18 of the magnetic head structure shown in FIG. 2. These assemblies 104 and 110 are cut along alternate long and short dash lines $124_1$, $124_2$ and $124_3$, as shown in FIG. 12, into chips 104$a$, 104$b$, 104$c$ and 104$d$, and chips 110$a$, 110$b$, 110$c$ and 110$d$, respectively. The cutting lines $124_1$, $124_2$ and $124_3$ are determined so as to pass through the centers of the holes 77$a$1, 77$b$1, 77$c$1, 77$d$1 and 77$e$1 of the component 103$a$ of the assembly 104 and to pass midway between the adjacent holes 77$a$2, 77$b$2, 77$c$2, 77$d$2 and 77$e$2 of the component 103$b$. Each of the assembly chips 104$a$ to 104$d$ is of the same construction as the front core 16 of the magnetic head structure shown in FIG. 2, and each of the assembly chips 110$a$ to 110$d$ is of the same construction as the back core chip 18.

After arranging annular winding coils manufactured in a separate process around each of the side legs 116 and 118 of the assembly chip 110$d$, for example, this assembly chip 110$d$ is placed in opposition to the assembly chip 104d, for example, such that the grooves 72 and 74 oppose the grooves 112 and 114 of the chip 110d.

A magnetic head structure as shown in FIG. 2 is manufactured by the above process.

Instead of using annular winding coils, winding coils may be formed by adhering the assembly chip 104d and the assembly chip 110d together, and winding the wire around the side legs 116 and 118.

The process for manufacturing the magnetic head structure shown in FIGS. 10A to 10H, 11 and 12 is very simple and allows processing with high precision. Since the magnetic plates and so on are adhered by molten glass, the adhesion may be made reliable and the adhesion strength may be improved. Furthermore, since the magnetic materials are block-shaped for processing, the working efficiency is high, shortening the processing time, lowering the rate of cracks and damage in the magnetic material, and improving the yield. Since the widths of the read/write gap 28 and the erase gaps 34 and 36 may be regulated by notch processing, these widths may be determined to high precision with ease. Furthermore, the front core chip 16 may be adhered to the back core chip 18 with high precision, and the lapping of the side surfaces of the chips 16 and 18 is unnecessary so that the working procedure may be made simpler and mass production may be facilitated. Since satisfactory precision even in the formation of the groove may be secured by simple machining, the quality of the products may be stabilized and the price may be minimized.

The present invention is not limited to the above embodiment. For example, the shape of the notch defining the track width may be rectangular, elliptical, or triangular. Moreover, more than one core chip may be formed in multi-stages. In such a case, a four-stage construction may be realized with the complete track width being the erase core chip, the write core chip, part of the erase core chip, and the read core chip arranged in the order named. In this case, spacers are interposed between the respective core chips for preventing mutual magnetic interference.

It is to be understood that various modifications may be made by those skilled in the art without departing from the spirit and scope of the present invention.

What we claim is:

1. A process for manufacturing a composite magnetic head structure comprising the steps of:

forming in a first magnetic plate and a second magnetic plate a plurality of parallel notches at a predetermined pitch and of a predetermined width with the space between adjacent notches defining a track width;

forming a groove defining a gap depth in said first magnetic plate in a direction perpendicular to said plurality of parallel notches;

adhering said first and second magnetic plates in such a manner that a non-magnetic material layer is interposed therebetween and said plurality of parallel notches in the respective magnetic plates oppose each other to form a plurality of holes;

opposing and adhering two assemblies formed by said adhering step in such a manner that non-magnetic spacing means is interposed therebetween and said plurality of parallel holes of said assemblies are mutually shifted by half the pitch;

cutting the obtained adhered assemblies into a plurality of assembly blocks along planes extending perpendicular to said spacing means and perpendicular to the longitudinal direction of said plurality of holes;

cutting the obtained assembly block into a plurality of first assembly chips along lines passing the middle points between said holes of one assembly and perpendicular to the longitudinal direction of said spacing means; and adhering said first assembly chips with second assembly chips processed to have grooves to form a first side leg, a second side leg and a common leg having a notch to correspond with said spacing means in such a manner that said notch of said common leg corresponds with said spacing means, thereby defining first and second magnetic flux paths, and forming respective windings on said first and second side legs.

2. A process according to claim 1, wherein the last step comprises winding windings on said first and second side legs respectively and adhering said first assembly chips to said second assembly chips.

3. A process according to claim 1, wherein the last step comprises arranging annular winding coils prepared in advance on said first and second side legs respectively and adhering said first assembly chips to said second assembly chips.

4. A process according to claim 1, wherein said non-magnetic material layer is formed by vapor deposition of the non-magnetic material.

5. A process according to claim 1, wherein said non-magnetic material layer is formed by sputtering the non-magnetic material.

* * * * *